United States Patent [19]
Weinhold

[11] Patent Number: 6,025,701
[45] Date of Patent: Feb. 15, 2000

[54] STATIC AND DYNAMIC MAINS VOLTAGE SUPPORT BY A STATIC POWER FACTOR CORRECTION DEVICE HAVING A SELF-COMMUTATED CONVERTER

[75] Inventor: Michael Weinhold, Erlangen, Germany

[73] Assignee: Siemens Aktiengesellschaft, Munich, Germany

[21] Appl. No.: 08/966,898

[22] Filed: Nov. 10, 1997

Related U.S. Application Data

[63] Continuation of application No. PCT/DE96/00792, May 7, 1996.

[30] Foreign Application Priority Data

May 9, 1995 [DE] Germany ............................. 195 16 604

[51] Int. Cl.[7] .................................................... G05F 1/70
[52] U.S. Cl. ............................................................ 323/207
[58] Field of Search .................................. 323/205, 207, 323/210, 211

[56] References Cited

U.S. PATENT DOCUMENTS

| | | | |
|---|---|---|---|
| 4,496,899 | 1/1985 | Lippitt et al. ............................. | 323/207 |
| 4,602,206 | 7/1986 | Walker .................................... | 323/211 |
| 5,138,247 | 8/1992 | Tanoue et al. .......................... | 323/207 |
| 5,187,427 | 2/1993 | Erdman ................................... | 323/207 |
| 5,329,221 | 7/1994 | Schauder ................................. | 323/207 |
| 5,343,139 | 8/1994 | Gyugyi et al. .......................... | 323/207 |
| 5,369,353 | 11/1994 | Erdman ................................... | 323/207 |
| 5,465,203 | 11/1995 | Bhattacharya et al. ................. | 323/207 |
| 5,642,007 | 6/1997 | Gyugyi et al. .......................... | 323/207 |
| 5,698,969 | 12/1997 | Gyugyi et al. .......................... | 323/207 |
| 5,754,035 | 5/1998 | Sen ......................................... | 323/205 |
| 5,818,208 | 10/1998 | Othman et al. .......................... | 323/210 |

FOREIGN PATENT DOCUMENTS

| | | | |
|---|---|---|---|
| 0476618A2 | 3/1992 | European Pat. Off. ........... | H02J 3/18 |
| 3429116A1 | 2/1986 | Germany .......................... | H02J 3/18 |

OTHER PUBLICATIONS

"PESC '92 Record", 23rd annual IEEE Power Electronics Specialists Conference Toledo, Spain, Mar. 1992, pp. 538–545.

"Development of a Large Static Var Generator Using Self-–Commutated Inverters for Improving Power System Stability", (Mori et al.), IEEE Transactions on Power Systems, vol. 8, No. 1, Feb. 1993, pp. 1–7 and 371–377.

"System Variable Evaluation with Digital Signal Processors for SVC Applications" (Welsh et al.), Fifth International Conference on AC and DC Power Transmission, pp. 255–260, Oct. 1997.

"Regelung statischer Kompensatoren–Entwicklung und Prüfung durch Simulation" (Bergmann et al.), Hochspannungstechnik, etz, vol. 115, No. 22–23, Dec. 1994, pp. 1332–1338.

"PESC '92 Record", 23rd Annual IEEE Power Electronics Specialists Conference Toledo, Spain, Mar. 1992, pp 521–529.

*Primary Examiner*—Jeffrey Sterrett
*Attorney, Agent, or Firm*—Herbert L. Lerner; Laurence A. Greenberg

[57] ABSTRACT

A mains voltage at a network node is statically and dynamically supported with a static power factor correction device which has a transformer and a self-commutated converter with at least one capacitive energy store. Instantaneous reference setpoint values for an underlying, secondary instantaneous control method are continuously determined as a function of determined voltage magnitude deviation of the mains voltage at the network node. The secondary instantaneous control method determines a phase angle as a function of determined instantaneous actual values. The phase angle defines the angle of the converter voltage space vector of the self-commutated converter as a function of the angle of the mains voltage space vector. This results in dynamic regulation of the reactive powers required for mains voltage regulation.

11 Claims, 5 Drawing Sheets

STATIC AND DYNAMIC MAINS VOLTAGE SUPPORT BY A STATIC POWER FACTOR CORRECTION DEVICE HAVING A SELF-COMMUTATED CONVERTER

CROSS-REFERENCE TO RELATED APPLICATION

This application is a continuation of international application PCT/DE96/00792, filed May 7, 1996.

BACKGROUND OF THE INVENTION

1. Field of the Invention

The invention relates to a method for static and dynamic support of a mains voltage at a grid system node by means of a static power factor correction device which has a transformer and a self-commutated converter with at least one capacitive energy store, and to an apparatus for carrying out the method.

Electrical power supply grid systems are used primarily for transmitting real power. The power produced and the power consumed must always be matched, otherwise frequency changes occur. In the same way as the real power equilibrium, the reactive power (volt-ampere power) equilibrium must also always be matched such that the voltage conditions in the grid system are acceptable. The reactive powers are primarily responsible for the voltage level. The real power and reactive power equilibrium in the grid system must be matched at all times such that the voltage and the frequency are within the predetermined limits.

As a result of increasing current consumption and limited grid system extension capabilities, the power transmission grid systems are being used more and more intensely. Reactive power flows in the grid system are the main cause of voltage drops and additional grid system losses. A matched reactive power equilibrium in the grid system, and thus the effects on the mains voltage and grid system losses, can be reduced by the deliberate use of reactive devices, such as capacitors and coils. The differing dynamic requirements can be covered by switchable or controllable reactive elements. However, in practice, continuous and dynamic changes are possible only by using converter circuits. Static power factor correction devices using thyristor technology represent the most economic solution for dynamic power factor correction at the moment.

The terms "Static Var Generator (SVG)", "Advanced Static Var Compensator (ASVC)" or "Static Condenser (STATCON)" are normally used for power factor correction devices which have a self-commutated converter with a capacitive energy store. Reactive powers at the fundamental frequency can be added or subtracted by means of the self-commutated inverter, which converts the DC voltage of a capacitive energy store (capacitor) into an AC voltage and is connected to a grid system node (PCC=Point of Common Coupling) via a transformer (reactance).

2. Description of the Related Art

A power factor correction device is disclosed in the article "A Comparison of Different Circuit Configurations for an Advanced Static Var Compensator (ASVC)" printed in "PESC' 92 Record; 23rd Annual IEEE Power Electronics Specialists Conference Toledo, Spain", 1992, pages 521–529. That article proposes a number of ASVC circuits and compares them with one another. The basic circuit of an ASVC comprises a three-phase inverter with a capacitive energy store. The inverter is connected to a grid system node (PCC) through a transformer.

The inverter of that system is either a two-point inverter or a three-point inverter. These inverters are conrolled by means of fundamental frequency modulation (full block control), the reactive powers which can be achieved at the fundamental frequency being greater in a three-point inverter than in a two-point inverter. In addition, the fifth and seventh harmonics are minimal if the angle β (angle range for zero potential) is equal to π/12. In addition, that article investigates ASVC circuits which comprise two two-point or three-point inverters, different transformers being used. Those circuits are intended to reduce the pulse number and the distortion of the phase current.

A Static Var Generator (SVG) for 80 MVA is proposed in the article "Development of a Large Static Var Generator Using Self-Commutated Inverters for Improving Power System Stability", printed in "IEEE Transactions on Power Systems", Vol. 8, No. 1, February 1993, pages 371–377. The 80 MVA SVG comprises eight inverters, whose bridge paths each comprise six series-connected gate turn-off thryistors (GTO), which each produce the same output voltage, but respectively shifted through 7.5° electrical with respect to one another. A special transformer with eight primary windings and eight secondary windings is required for that phase shift. The special transformer is connected to a high-voltage grid system by means of a main transformer. The transformer design requires a part of the reactive powers provided. A pulse number of 48 is thus obtained, and hence a reduction in the grid system feedback effects, while the fundamental power is at the same time increased. That power factor correction device (SVG) also achieves an improvement in the fundamental power only by using a plurality of inverters and a special transformer, but the fundamental yield per switching device of the inverter is not increased.

A further option for improving the fundamental yield (power per switching element) is to use a multipoint inverter. A five-point inverter for an SVC is proposed in detail in the article "A High Voltage Large Capacity Dynamic Var Compensator Using Multilevel Voltage Source Inverter", printed in "PESC' 92 Record, 23rd Annual IEEE Power Electronics Specialists Conference Toldedo, Spain", 1992, pages 538–545. The use of a mulitpoint inverter improves the fundamental yield for the AC voltage produced by the inverter.

The article "System Variable Evaluation With Digital Signal Processors for SVC Applications" by G. Welsh et al., printed in "Fifth International Conference on AC and DC Power Transmission", 1991, pages 255–260 discloses a voltage regulation system for a static power factor correction device (SVC) comprising a permanently connected capacitance (FC), a thyristor-controlled coil (TCR) and a thyristor-switched capacitance (TSC), which is constructed in digital form. That voltage regulation system uses the three line-ground voltages to determine a system voltage (mean value of the three line-line voltages, which are compared with a system reference voltage). The control error obtained is used to determine a control signal for the power factor correction device, by means of a voltage regulator at whose output susceptance value is produced. In that digital regulation system, the system voltage is determined using a signal processor, which is part of a multiprocessor control system (SIMADYN D).

The above-mentioned publication "PESC' 92 Record, 23rd Annual IEEE Power Electronics Specialists Conference Toledo, Spain", 1992, pages 538–545, proposes not only a five-point inverter for an SVC in detail, but also the associated control system. That control system has a device on the input side which is used to determine the mean value of a reactive power control error $Q_s$ as a function of a reactive power value $Q_L$ required by a load and a reactive power value $Q_I$ supplied by the self-commutated inverter.

A downstream PI regulator uses this value $Q_s$ to produce a manipulated variable $\phi_m$ (phase angle for the inverter). The drive element, which has optimized pulse patterns, uses the manipulated variable $\phi_m$ and a modulation value $M_i$ to generate control signals for the self-commutated inverter. That control system ensures that the reactive power control error $Q_s$ is reduced to zero. If the control error $Q_s$=0, then the manipulated variable $\phi_m$=0 and the output voltage of the inverter is in phase with the voltage at the coupling point PCC. The purpose of that control system is to supply the reactive powers required by the load from the self-commutated inverter. The control system therefore cannot statically or dynamically support the mains voltage at the coupling point (point at which the power factor correction device is connected to the grid system).

SUMMARY OF THE INVENTION

It is accordingly an object of the invention to provide a method and apparatus for static and dynamic support of a mains voltage by means of a static power factor correction device having a self-commutated converter, which overcomes the above-mentioned disadvantages of the heretofore-known devices and methods of this general type and which static and dynamic support of the mains voltage at the network node.

With the foregoing and other objects in view there is provided, in accordance with the invention, a method for static and dynamic support of a mains voltage at a network node, which comprises the steps of:

providing a static power factor correction device with a transformer and a self-commutated converter with at least one capacitive energy store;

continuously determining reference values as a function of deviations between a magnitude of a mains voltage space vector at the network node and a predetermined magnitude reference value of the mains voltage space vector;

producing a phase angle as a function of deviations between an actual value and the reference values, the phase angle indicating an instantaneous phase shift of a generated voltage-space vector of the self-commutated converter with respect to a measured mains voltage space vector;

determining from the phase angle an angular position of the mains voltage space vector of the self-commutated converter as a function of the angular position of the voltage space vector; and selecting, based on the angular position of the mains voltage space vector of the self-commutated converter, associated switching state signals for the self-commutated converter by means of predetermined optimized pulse patterns.

In order to regulate the mains voltage at the coupling point to a constant amplitude, the power factor correction device has to exchange transfer reactive powers with the grid system. Assuming that the operating point of the power factor correction device is stationary, no power being exchanged with the grid system at this point (no load), the power factor correction device supplies transfer reactive powers to the grid system in the event of a sudden drop in voltage, which counteracts this voltage drop. On the other hand, in the event of a voltage increase, the power factor correction device takes transfer reactive powers from the grid system.

The first part of the control method relates to the voltage regulation, which produces a reference value for the second part of the control method. The second part of the control method, the instantaneous control method, uses the already obtained reference values directly with the aid of the angle of the determined mains voltage space vector at the coupling point to produce a manipulated variable (angle of the voltage space vector of the self-commuted converter of the power factor correction device), which is converted into switching state signals by means of optimized pulse patterns.

This dynamically manipulated variable ensures that energy is exchanged between the power factor correction device and the grid system. As soon as the desired instantaneous reactive powers are reached (new operating point), the dynamically manipulated variable becomes zero again. For transient processes (reactive power change), the relative phase angle of the converter voltage space vector with respect to the mains voltage space vector is shifted such that an instantaneous power other than zero is obtained for this transient process. This is necessary so as to allow a new operating point (reactive power change) to be set.

This cascaded control method means that the power factor correction device can react quickly to a change in the mains voltage at the coupling point, and can emit to the grid system, or take from the grid system, the instantaneous reactive powers required to support the mains voltage at a predetermined value.

In accordance with an added feature of the invention, the instantaneous reactive power is used as the actual value in the producing step. The actual value of the instantaneous reactive power is determined, in accordance with another feature of the invention, according to the equation:

$$q = \tfrac{3}{2}(v_\beta \cdot i_\alpha - v_\alpha \cdot i_\beta),$$

where $v_\alpha$, $v_\beta$ are coordinates of a mains voltage space vector, $i_\alpha$, $i_\beta$ are coordinates of a grid system current space vector, and q is the actual value of the instantaneous reactive power.

In accordance with another feature of the invention, an instantaneous reactive current component is used as the actual value in the producing step. The actual value of the instantaneous reactive current is determined, in accordance with the invention, with the equation:

$$i_{sv} = (v_\beta \cdot i_\alpha - v_\alpha \cdot i_\beta)/|\underline{v}|$$

where $v_\alpha$, $v_\beta$ are coordinates of a mains voltage space vector, $i_\alpha$, $i_\beta$ are coordinates of a grid system current space vector, $|\underline{v}|$ is a magnitude of the mains voltage space vector, and $i_{sv}$ is the actual value of the instantaneous reactive current.

With the above and other objects in view there is also provided, in accordance with the invention, an apparatus for static and dynamic support of a mains voltage at a network node, in combination with a static power factor correction device having a transformer and a self-commutated converter with at least one capacitive energy store. The apparatus comprises:

a voltage control loop with a secondary instantaneous control loop;

a drive element for driving the self-commutated converter of the static power factor correction device;

a subtractor having a first input receiving an angle value of a determined mains voltage space vector at the network node, a second input, and an output connected to the drive element;

the instantaneous control loop having an output connected to the second input of the subtractor.

The apparatus is configured so as to carrying out the above-noted method of to the invention for a static power factor correction device. The latter has a self-commutated converter with at least one capacitive energy store and a transformer. The apparatus has a voltage control loop with a secondary instantaneous control loop. The output of the secondary instantaneous control loop connects to a second input of a subtractor to whose first input an angle value of the determined mains voltage space vector at the grid system node is applied. As a manipulated variable for the drive element, the apparatus generates an angle value of the converter space vector as a function of the mains voltage at the network node. Since optimized pulse patterns are used in the drive element, switching signals are selected as a function of the specific angle values of the converter space vector and cause the converter to set the desired voltage space vector at the converter output. This converter voltage space vector is used to obtain a changed voltage drop (magnitude and phase) across the leakage reactance of the transformer, which follows the grid system current in such a manner that, during a transient process, one current component is provided in phase or in antiphase with the mains voltage space vector, and one at right angles thereto. This component in phase with or in antiphase with the mains voltage space vector forms, together with the space vector, an instantaneous power which must be available for the required reactive power change in order that the capacitive energy store can be charged or discharged. At the end of the transient process, the capacitive energy store of the converter and the grid system current space vector accordingly have appropriate voltages corresponding to the desired operating point and a desired current component at right angles to the mains voltage space vector.

This control structure corresponds to a cascaded control system. A reference value which is produced by the higher-level, slower control loop is implemented by a secondary, faster control loop.

In accordance with again another feature of the invention, the voltage control loop includes a mains voltage magnitude generator and a comparator with a downstream regulator, the comparator having a non-inverting input receiving a predetermined magnitude reference value of the mains voltage space vector at the network node.

In accordance with again a further feature of the invention, the secondary instantaneous control loop includes a comparator with an inverting input, a non-inverting input, a downstream regulator and a device for calculating an instantaneous actual value, the device having an output connected to the inverting input of the comparator, and the non-inverting input of the comparator being connected to an output of sid regulator of the voltage control loop.

In accordance with a concomitant feature of the invention, the device for calculating the instantaneous actual value is a computer wherein the above equations are stored, and the computer is programmed to process the equations.

Other features which are considered as characteristic for the invention are set forth in the appended claims.

Although the invention is illustrated and described herein as embodied in a method and apparatus for static and dynamic support of a mains voltage by means of a static power factor correction device having a self-commutated converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
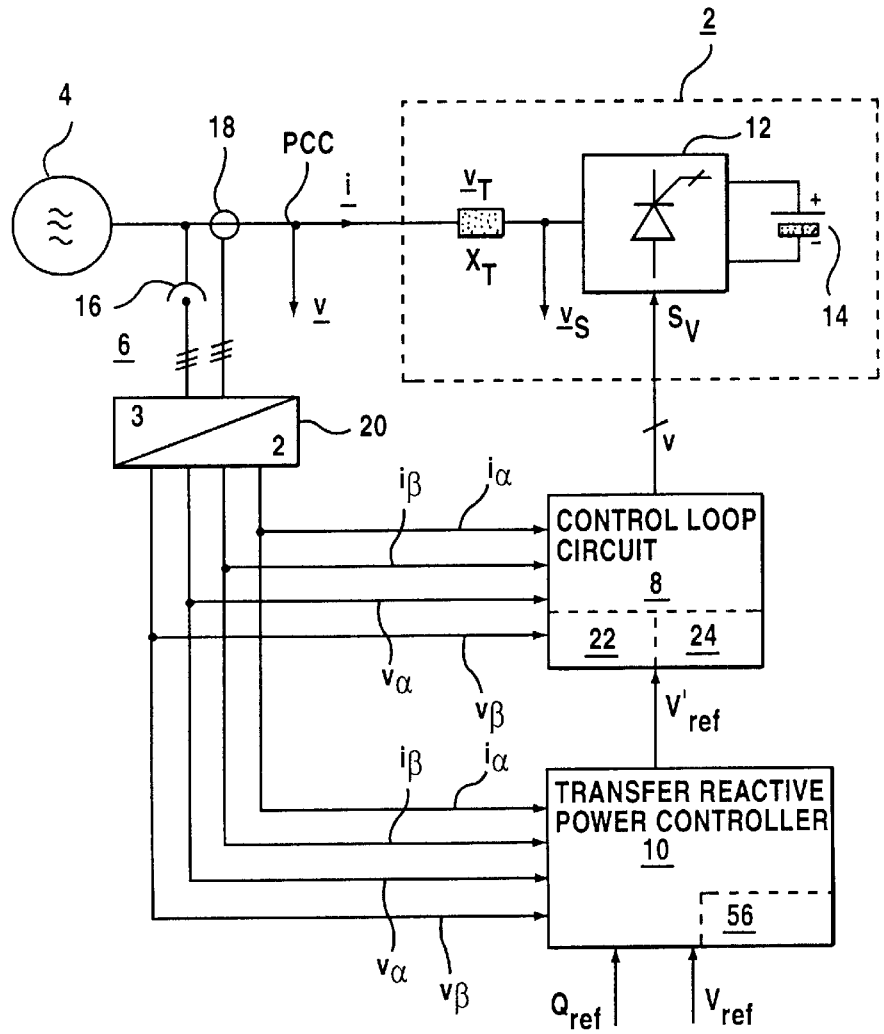
FIG. 1 is a block diagram of the power factor correction device connected to a three-phase grid system with the apparatus for carrying out the method according to the invention.
Figure 11:
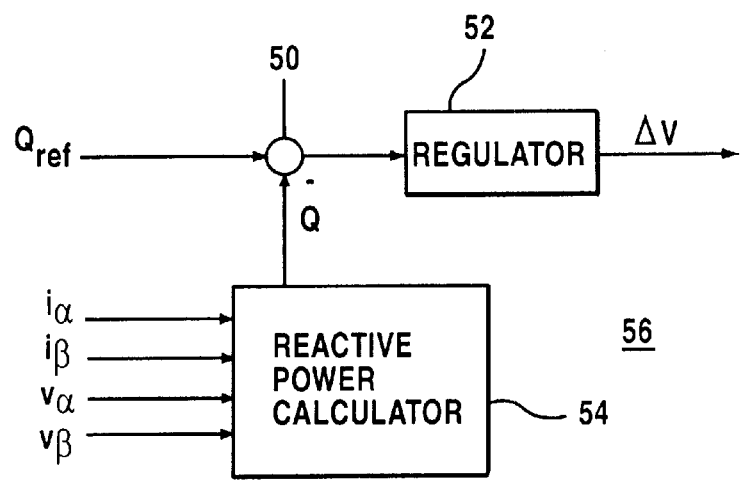
FIG. 11 illustrates a block diagram of a prior art transfer reactive power control loop.

Referring now to the figures of the drawing in detail and first, particularly to the block diagram of FIG. 1, there is shown a power factor correction device 2, a three-phase grid system 4, a measured value device 6, an apparatus 8 for carrying out the method according to the invention, and a conventional transfer reactive power control system 10 having a transfer power reactive control loop (FIG. 11). The static power factor correction device 2 has a self-commutated converter 12 with at least one capacitive energy store 14 and a transformer, which appears as an inductance $X_T$ in the illustration. The transformer is used to connect the self-commutated converter 12 to the three-phase grid system 4. The coupling point or network node is designated PCC (Point of Common Coupling). As already mentioned initially, the terms "Static Var Generator (SVG)", "Advanced Static Var Compensator (ASVC)" or "Static Condenser (STATCON)" are in normal use for such a power factor correction device 2.

The measuring device 6 comprises a high-voltage instrument transformer 16, a current measuring device 18, measurement conditioning (which is not illustrated in more detail) and a coordinate converter 20. The current measuring device 18 may also be arranged on the low-voltage side of the transformer of the static power factor correction device 2. The outputs of this coordinate converter 20, at which the Cartesian coordinate $v_\alpha$, $v_\beta$ of the mains voltage space vector $\underline{v}$ and the cartesian coordinates $i_\alpha$, $i_\beta$ of the grid system current space vector $\underline{i}$ are present, are each supplied to the apparatus 8 and to the control system 10. Such a coordinate converter 20 is sufficiently well known from field-oriented control systems for asynchronous machines. The apparatus 8 for carrying out the method according to the invention includes a control cascade, which comprises a higher-level voltage control loop 22 (illustrated in more detail in FIG. 3) and a secondary instantaneous control loop 24 (FIGS. 4 and 5 each illustrating one embodiment in more detail).

From the point of view of the grid system 4, the static power factor correction device 2 may be regarded as a three-port device, potential points with a reference node within the power factor correction device 2 each representing the grid system connection terminals of a port. Since this is a three-line system, the grid system currents have no zero phase-sequence element. Since zero phase-sequence elements do not form any instantaneous power in voltages with currents that are free of zero-phase sequences, all the power calculations can be carried out using the current and voltage space vectors.

The instantaneous power p(t) is linked to the current flowing into the static power factor correction device 2. In the phase-by-phase illustration, it is calculated from the sum of the instantaneous powers flowing into the three ports and, using the space vector illustration, can accordingly be determined relatively easily from the α and β coordinates of mains voltage and grid system current space vectors $\underline{v}$ and $\underline{i}$. The instantaneous power which a mains voltage space vector $\underline{v}$ rotated through −90° would form with the grid system current space vector $\underline{i}$ is called the instantaneous reactive power q(t), and can likewise be determined with the aid of the a and b coordinates of the mains voltage and grid system current space vectors $\underline{v}$ and $\underline{i}$. In the steady state, with ideal sinusoidal mains voltages and grid system currents, q(t) is identical to the fundamental transfer reactive powers Q. The real power P is the mean value of the instantaneous power p(t) measured over one grid system cycle and is equal to zero in the steady state (except for losses in the static power factor correction device).

Figure 2:
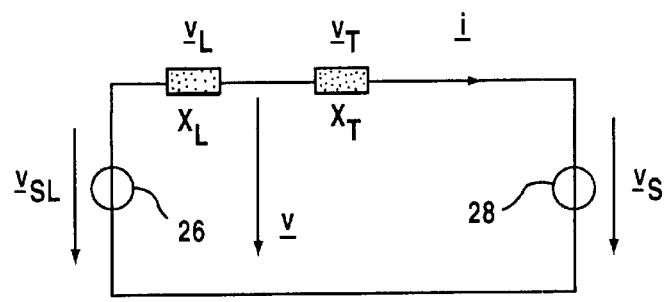
FIG. 2 is a circuit diagram illustrating an associated real equivalent.

In the equivalent circuit according to FIG. 2, the ideal grid system 4 is represented by the voltage source 26 with the voltage $\underline{v}_{SL}$. Its finite short-circuit power is represented by the inductance $X_L$. The leakage inductance of the static power factor correction device and of the transformer for voltage matching is represented by the inductance $X_T$. The voltage $\underline{v}_S$ on the grid system side of the self-commutated converter 12 is represented by the voltage source 28. A grid system current space vector $\underline{i}$ is produced as a function of the voltage space vector $\underline{v}_s$ of the self-commutated converter 12, and produces a voltage space vector $\underline{v}_T$ on the leakage inductance $X_T$ of the transformer for voltage matching. Presetting the magnitude and phase of the voltage space vector $\underline{v}_s$ of the self-commutated converter 12 allows the energy exchange between the static power factor correction device 2 and the grid system 4 to be defined.

In order to regulate the mains voltage $\underline{v}$ at the coupling point PCC to a constant amplitude V, the static power factor correction device 2 must exchange transfer reactive powers with the grid system 4. In practice, the short-circuit power of the grid system 4 is finite, rather than being infinite. The voltage space vector $\underline{v}$ and coupling point PCC is thus equal to the sum of the voltage space vectors $v_{SL}$ and $v_L$ (voltage drop on the short-circuit inductance $X_L$). If the amplitude of the voltage space vector $V_{SL}$ now drops suddenly to a lower value, then, subject to the precondition that the static power factor correction device 2 does not exchange any power with the grid system 4 (no load), this is linked to a corresponding drop in the voltage $\underline{v}$ at the coupling point PCC. This voltage drop can be compensated for by the static power factor correction device 2 emitting transfer reaction powers to the grid system (acting like a capacitor). In consequence, the amplitude V of the mains voltage space vector $\underline{v}$ is increased by the amount I×$X_L$ in comparison with the amplitude $V_{SL}$. Conversely, an increase in the amplitude V can be compensated for by the static power factor correction device 2 taking transfer reactive powers from the grid system 4 (acting like an inductance).

Figure 3:
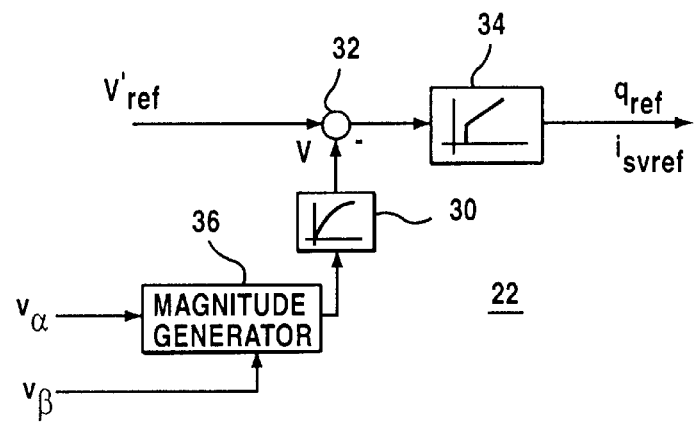
FIG. 3 is a block circuit diagram of the higher-level voltage control circuit.

In the case of the voltage control loop 22, it is advantageous to use the space vector representation. Instead of the time average of the amplitudes of the individual line-ground voltages at the coupling point PCC, the magnitude of the voltage space vector $\underline{v}$ at the coupling point PCC is analyzed directly (with a sinusoidal three-phase voltage system, this is identical to the line-ground phase voltage amplitudes). This magnitude is expediently also suitably filtered using a filter 30, for example a first-order delay element, in order to reduce the influence of mains voltage distortion sufficiently. The filtered variable V, as illustrated in FIG. 3, is compared with a voltage amplitude reference value $V'_{ref}$ by means of a comparator 32, and the control error is supplied to a PI regulator 34. The output signal is an instantaneous (setpoint) reference value $q_{ref}$ or $i_{svref}$, respectively, which is passed to the secondary instantaneous control loop 24. The magnitude of the voltage space vector $\underline{v}$ and the coupling point PCC is determined by means of the magnitude generator 36, as a function of the voltage coordinates $v_\alpha$ and $v_\beta$ of the voltage space vector $\underline{v}$ at the coupling point PCC.

Figure 4:
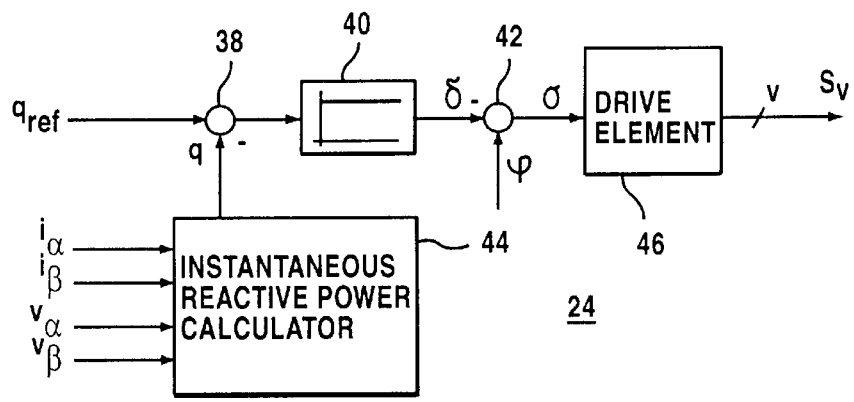
FIGS. 4 and 5 each illustrates a block diagram on the secondary instantaneous control loop (instantaneous reactive power regulation, instantaneous reactive current regulation)

FIG. 4 illustrates a block diagram of a first embodiment of the secondary instantaneous control loop 24. Since this control loop 24 is supplied with an instantaneous reactive power reference value $q_{ref}$, this type of regulation is called instantaneous reactive power regulation. This control loop 24 comprises a comparator 38 on the input side with a downstream P regulator 40 and a subtractor 42 on the output side. The inverting input of the comparator 38 is linked to the output of a device 44 for calculating an instantaneous reactive power actual value q. The coordinates $i_\alpha$, $i_\beta$, and $v_\alpha$, $v_\beta$ of the grid system current space vector $\underline{i}$ and of the mains voltage space vector $\underline{v}$ are applied to the inputs of this device 44. In the case of this advantageous embodiment, the device 44 is provided as a computer in which the equation $$q = \tfrac{3}{2} \cdot (v_\beta \cdot i_\alpha - v_\alpha \cdot i_\beta)$$

is stored.

The output of the subtractor 42 is linked to the input of a drive element 46, which generates switching status signals $S_v$ with the aid of optimized pulse patterns from the determined angle σ of the converter voltage space vector $\underline{v}_s$ for the self-commutated converter 12 of the static power factor correction device 2. The first input of this subtractor 42 has applied to it an angle value φ of the mains voltage space vector $\underline{v}$ at the coupling point PCC. The second input of this subtractor 42 is connected to the output of the P regulator 40, at which a phase angle value δ is present.

Figure 5:
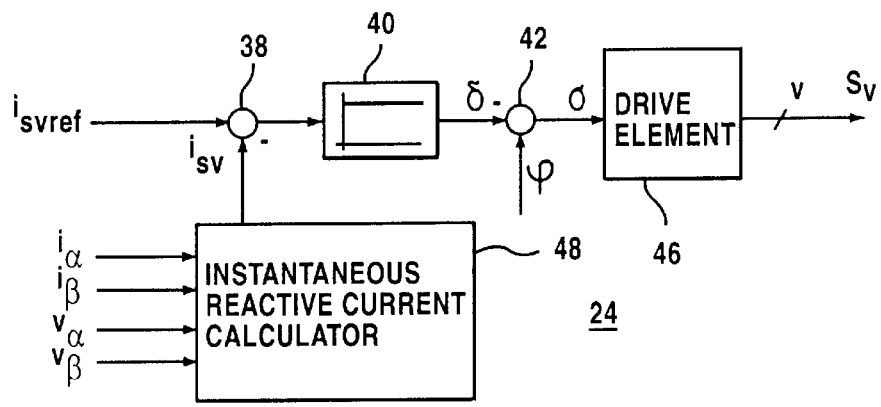

The second embodiment of the secondary instantaneous control loop 24, whose block diagram is shown in FIG. 5, differs from the first embodiment according to FIG. 4 in that an instantaneous reactive current reference value $i_{svref}$ is supplied as the reference value to the comparator 38 on the input side. The inverting input of this comparator 38 is connected to a device 48 for calculating an instantaneous reactive current actual value $i_{sv}$. This actual value $i_{sv}$ is calculated by means of the coordinates $i_\alpha$, $i_\beta$ and $v_\alpha$, $v_\beta$ of the grid system current space vector $\underline{i}$ and of the mains voltage space vector $\underline{v}$ using the following equation $i_{sv}=(v_\beta \cdot i_\alpha - v_\alpha \cdot i_\beta)/|\underline{v}|.$ Since, in this instantaneous control loop 24, the instantaneous reactive current $i_{sv}$ is used to produce the phase angle δ, this is also called instantaneous reactive current regulation.

Figure 6:
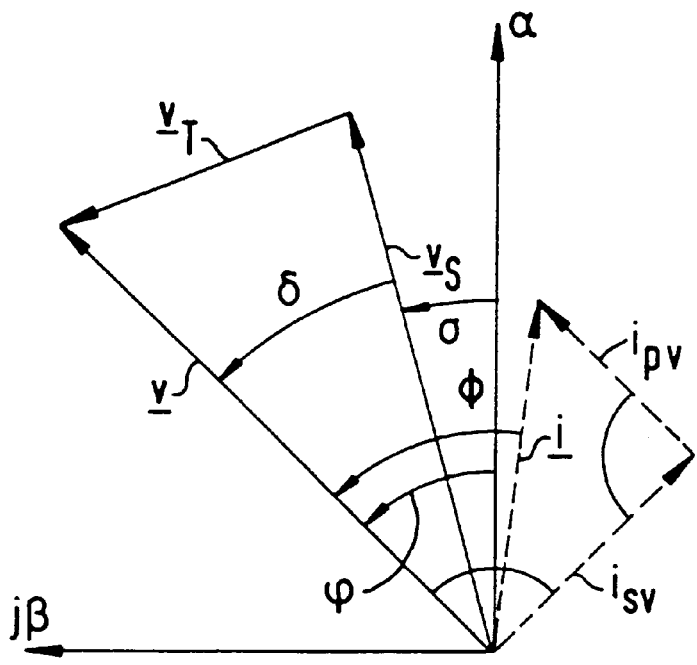
FIG. 6 is a dynamic space vector diagram associated with the equivalent circuit according to FIG. 2.

FIG. 6 shows the dynamic phase vector diagram associated with the equivalent circuit in FIG. 2. The revolving space vector $\underline{v}$ is obtained from the measured phase variables by means of the specified coordinate transformation. The relative phase angle of the converter voltage space vector $\underline{v}$, with respect to the revolving mains voltage space vector $\underline{v}$ is designated by the phase angle δ. The angle φ indicates the position of the revolving mains voltage space vector $\underline{v}$ with respect to the α axis of the stationary orthogonal coordinate system α, β. The angle σ indicates the position of the revolving converter voltage space vector $\underline{v}_s$ with respect to this δ axis. The revolving grid system current space vector $\underline{i}$ can be broken down into two components with respect to the mains voltage space vector $\underline{v}$:

One component in phase with, or in anti-phase with the revolving mains voltage space vector $\underline{v}$, which is designated $i_{pv}$, and another component at right angles to this mains voltage space vector $\underline{v}$, which is designated $i_{sv}$. By a simple calculation, it can be shown that only the component $i_{pv}$ contributes to the formation of the instantaneous power. Conversely, the component $i_{sv}$ contains all the information about the instantaneous reactive power. Both the instantaneous reactive power q(t) and the instantaneous power p(t) can be calculated very easily from the coordinates of the mains voltage and grid system current space vectors $\underline{v}$ and $\underline{i}$. In the steady state, no instantaneous power p(t) is exchanged between the static power factor correction device 2 and the grid system 4 (apart from losses), and thus no real power P either, but only instantaneous reactive power q(t), i.e. reactive power Q.

Figure 7:
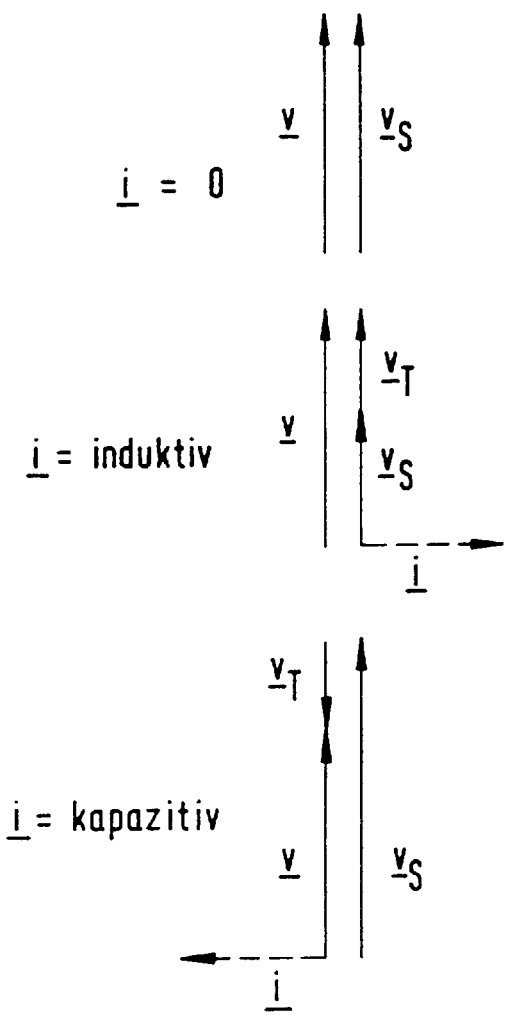
FIG. 7 is a diagram showing the phasors for steady-state operation.

The phasors (rotating vectors) in FIG. 7 apply to different steady operating states (no load, inductive load, capacitive load). The fact that reactive powers are exchanged in the steady state between the grid system 4 and the static power factor correction device 2 can be seen in the phasor diagrams by the fact that the mains voltage and grid system current space vectors $\underline{v}$ and $\underline{i}$ are always at right angles to one another (in dynamic operating states, these phases may be related in any way, depending on the instantaneous power p(t) which occurs).

Figure 8:
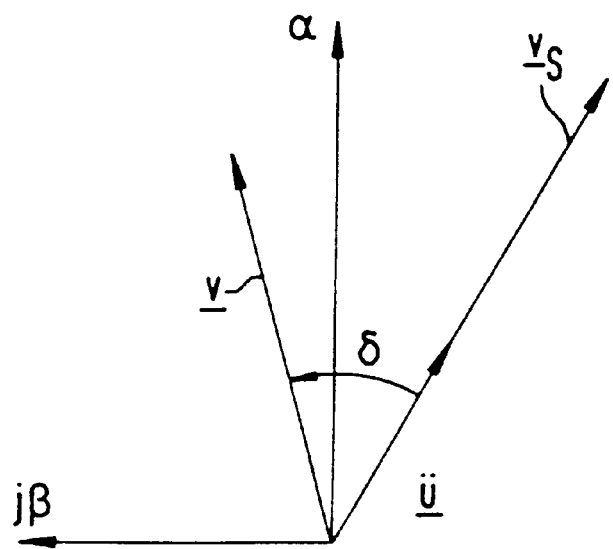
FIG. 8 is a space vector diagram illustrating the relationship between a converter voltage space vector and the intermediate circuit voltages in the converter.

The relationship between the converter voltage space vector $\underline{v}_s$ and the intermediate circuit voltages is particularly simple if the DC voltages are all of the same size. The ratio is then described by the transformation ratio space vector +e,uml u+ee . Assuming that the angle argument of the mains voltage is ωt and that the phase angle between the converter voltage space vector $\underline{v}_s$ and the mains voltage space vector $\underline{v}$ is designated δ, the corresponding angular relationships apply in accordance with the phasor diagram in FIG. 8, and the following equations:

$\underline{v}_s(t)=\underline{\ddot{u}}(t)\cdot V_{dc}$ $\underline{\ddot{u}}(t)=|+e,uml u+ee|\cdot e^{j(\omega t-\delta)}$ With the optimized pulse pattern, the magnitude of the transformation ratio space vector +e,uml u+ee is also constant. This means that the intermediate circuit voltages assume different values depending on the magnitude of the current space vector $\underline{i}$ and thus on the magnitude of the reactive powers exchanged. If the static power factor correction device 2 operates like an inductor and takes reactive power from the grid system 4, then the DC voltages are less than on no load. In the capacitive region of the static power factor correction device 2, the DC voltages are greater than on no load. This can also be seen in the phasor diagram according to FIG. 7. Conversely, it can be confirmed that the DC voltages must change in order to produce a desired exchange of reactive power with the grid system. These DC voltages are, however, linked during the transient charging and discharging process required for this purpose to the exchange of energy between the grid system and DC capacitors. The component $i_{pv}$ must therefore always be present for reactive power changes in the grid system currents, since only this current component $i_{pv}$ forms the instantaneous power p(t) with the mains voltage space vector $\underline{v}$.

Figure 9:
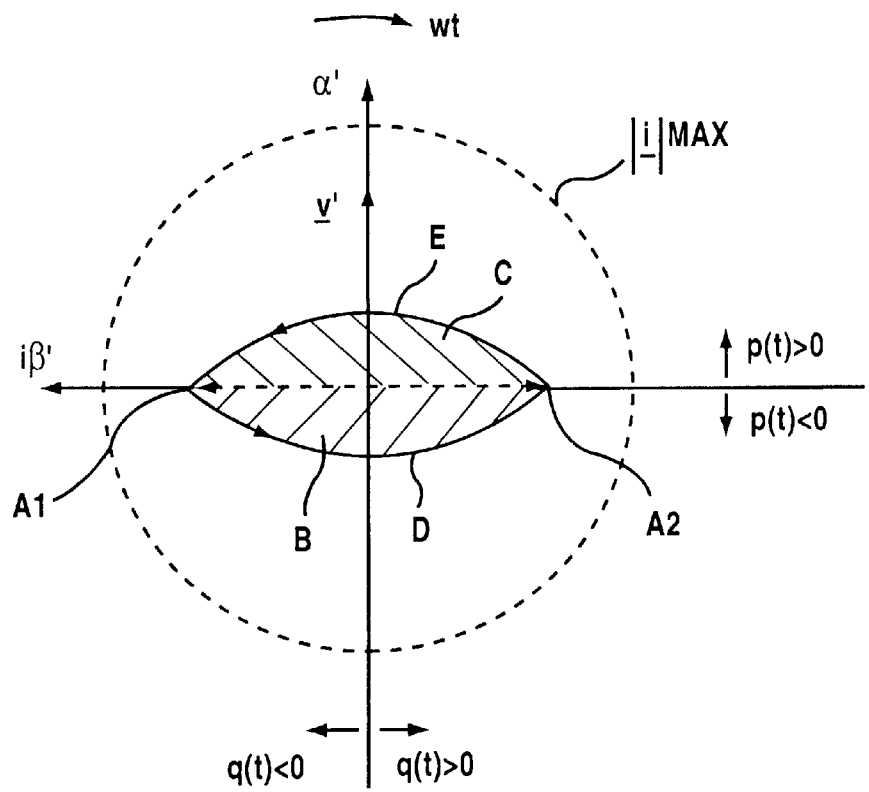
FIG. 9 is a phasor diagram illustrating a transient process for setting a new operating point for the power factor correction device.

This transient process is indicated in FIG. 9 using a coordinate system α', iβ' which revolves at ωt, the mains voltage space vector $\underline{v}'$ being stationary in the revolving coordinate system α', iβ', and pointing in the a' direction. In this coordinate system, the stationary current component $i_{pv}$ always points in the α' or −α' direction while, in contrast, the stationary current component $i_{sv}$ always points in the β' or −β' direction. The point designated by A1 represents, by way of example, the capacitive region of the static power factor correction device 2. The phase of the current space vector $\underline{i}'$ with respect to the voltage space vector $\underline{v}'$ is 90°. The operating point, which is designated by A2, applies to the inductive region. In steady-state operation, the α' coordinate of the current space vector $\underline{i}'$ is always equal to zero. As already mentioned, energy has to be exchanged between the static power factor correction device and the grid system 4 in order to set a new operating point, that is to say a value α' other than zero must be present in the grid system current space vector $\underline{i}'$ during the exchange. In order to reduce the reactive power emitted to the grid system 4 (reduction in the capacitive mode of operation), the voltage across the intermediate circuit capacitors 14 of the self-commutated converter 14 must be reduced. In other words, an energy flow takes place from the static power factor correction device 2 into the three-phase voltage grid system 4. The α' component required for this purpose must be negative, and the path which the tip of the current space vector $\underline{i}'$ has to travel in this coordinate system (position curve of the current space vector $\underline{i}'$ during the transient process) runs, as indicated, underneath the β' axis. For practical applications, it is important that, during the transient process, the current space vector $\underline{i}'$ does not leave a circle which is defined by the switching capacity of the gate turn-of power semiconductor elements of the self-commutated converter 12 and is represented by an interrupted line and designated $|\underline{i}|_{max}$, since protective disconnections would otherwise occur. In addition, the shape of the position curve (trajectory) is a measure of the quality of the regulation. If, for example, the static power factor correction device 2 is intended to reach its new steady state as quickly as possible, then the trajectory must move on the most direct path possible from one operating point to the other.

The current component of $i_{pv}$ (FIG. 6) is formed by a corresponding voltage drop $\underline{v}_T$ across the leakage reactancies (the current is proportional to the voltage/time integral). This leakage reactance space vector $\underline{v}_T$ is caused by the fact that a phase angle δ is demanded by the control system dynamically between the group system voltage space vector $\underline{v}$ and the converter voltage space vector $\underline{v}_s$. As soon as the desired instantaneous reactive powers q(t) are reached (the capacitive energy stores 14 of the self-commutated converter 12 are at the voltage corresponding to the desired operating point A2) and the grid system current space vector i has the desired current component $i_{sv}$) the phase angle δ is zero again (ignoring power losses). The intermediate circuit voltages of the self-commutated converter 12 are simply set, without any explicit regulation, to the value associated with the operating point A1 or A2, respectively.

The shaded area B, which is enclosed by the β-axis of the revolving coordinate system and the trajectory D (position curve), contains the energy which is emitted from the self-commutated converter 12 of the stationary power factor correction device 2 into the grid system 4 during the transient charge-changing process. The transient process starts at the operating point A1 (capacitive operation of the power factor correction device) and ends at the operating point A2 (inductive operation of the power factor correction device). The shaded area C which is enclosed by the β-axis of the revolving coordinate system and the trajectory E (position curve) contains the energy which is exchanged between the grid system 4 and the self-commutated converter 12 of the power factor correction device 2 during the transient charge-changing process. This transient process starts at the operating point A2 (inductive operation) and ends at the operating point A1 (capacitive operation). As can likewise be seen from this diagram, only reactive powers are passed into the grid system 4 and taken from the grid system by the static power factor correction device 2 at the operating points A1 and A2. Instantaneous power p(t) for the charge-changing process of the capacitive energy stores 14 of the self-commutated converter 12 is required only during the transient processes.

Figure 10:
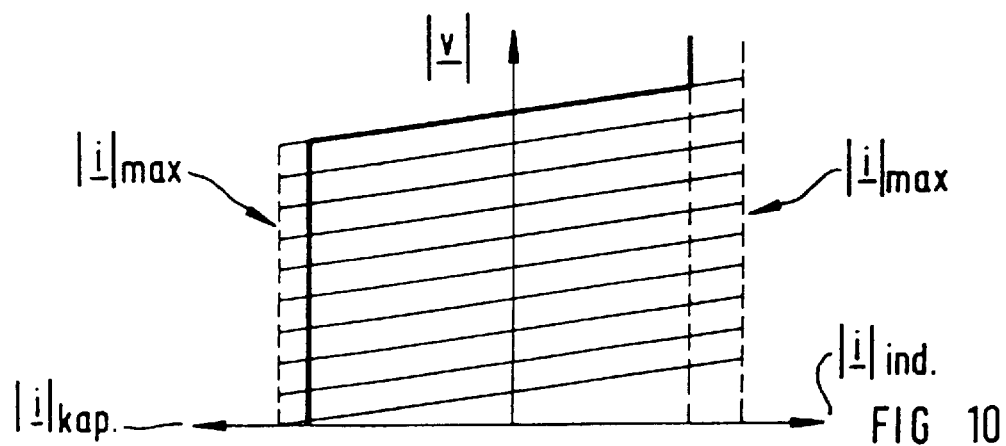
FIG. 10 is a plot illustrating the so-called voltage/current characteristic of the power factor correction device.

FIG. 10 shows the so-called voltage/current characteristic of the static power factor correction device 2 with a self-commutated converter 12 having at least one capacitive energy store 14. Each of the parallel lines rising from the left indicates the operating characteristic of the static power factor correction device 2 for a constant converter voltage space vector magnitude $V_s$ as a function of the mains voltage space vector magnitude V. The current space vector magnitude resulting from this can be read from the abscissa. The grid system characteristic $V=V_{SL}-I \cdot X_L$, for example, can be entered on this diagram. The intersection with the corresponding operating characteristic of the static power factor correction device 2 is the steady-state operating point A1 or A2, respectively. It is easy to determine from the diagram the converter voltage space vector magnitude $V_S$ or the grid system current space vector magnitude I which is required for the mains voltage space vector v to assume its reference value again. This corresponds to the search for the operating characteristic of the static power factor correction device 2, which intercepts the grid system characteristic at the desired operating point A1 or A2, respectively. In practice, the operating range is governed, for example, by the limited thermal load (thick line parallel to the ordinate), the maximum transient current which can be turned off by the power semiconductor switches in the converter 12 (dashed line) and the maximum permissible intermediate circuit voltage of the converter 12. The regulation described here produces the desired operating point with very good dynamic operating characteristics.

Similarly to the regulation for the conventional static power factor correction devices, the static power factor correction device 2 in this control method having a self-commutated converter 12 can also be controlled in a quasi-steady-state manner at an operating point A1 or A2, respectively, which is optimal from the operating point of view (for example low losses, large control margin for regulation processes). The regulation controls the static power factor correction device 2, for example, in the direction of the desired operating point (or changes the exchanged transfer reactive power) as long as it does not leave a predetermined tolerance band for the mains voltage at the coupling point PCC (for example 0.98 . . . 1.02 pu). This slow regulation, which is superimposed on the voltage regulation, has as its reference value a steady-state reference transfer reactive power $Q_{ref}$, and compares this with the actual transfer reactive powers Q by means of a comparator 50, which is connected downstream of a regulator 52. The output variable ΔV of the regulator 52 is used to modify the mains voltage reference value $V_{ref}$ and is supplied, as a modified reference value $V'_{ref}$ to the voltage control loop 22. The actual transfer reactive powers Q are calculated as a function of the coordinates $i_\alpha$, $i_\beta$ and $v_\alpha$ and $v_\beta$ of the determined grid system current space vector i and of the determined mains voltage space vector v at the coupling point PCC by means of the device 54. To this end, this device 54 contains, for example, the equations $$Q(t) = \frac{1}{T} \int_O^T q(t) \cdot dt$$

and $$q(t) = 3/2(V_\beta \cdot i_\alpha - V_\alpha \cdot i_\beta)$$

This transfer reactive power control loop 56 has been disclosed, for example, in the German Journal "etz", Volume 115, 1994, Issue 22–23, pages 1332 to 1338, this publication describing a conventional static power factor correction device, comprising a thyristor-controlled inductor coil (TCR), a thyristor-switched capacitor (TSC) and a fixed capacitor (FC).

This slow regulation does not conflict with the fast, super-imposed regulation cascade, since it operates in the order of seconds instead of in the order of milliseconds. The time constants are sufficiently decoupled.

I claim:

1. A method for static and dynamic support of a mains voltage at a network node, which comprises:
   providing a static power factor correction device with a transformer and a self-commutated converter with at least one capacitive energy store;
   continuously determining reference values as a function of deviations between a magnitude of a mains voltage space vector at the network node and a predetermined magnitude reference value of the mains voltage space vector;
   producing a phase angle as a function of deviations between an actual value and the reference values, the phase angle indicating an instantaneous phase shift of a generated voltage-space vector of the self-commutated converter with respect to a measured mains voltage space vector;
   determining from the phase angle an angular position of the mains voltage space vector of the self-commutated converter as a function of the angular position of the voltage space vector; and
   selecting, based on the angular position of the mains voltage space vector of the self-commutated converter, associated switching state signals for the self-commutated converter through predetermined optimized pulse patterns.

2. The method according to claim 1, which comprises using an instantaneous reactive power as the actual value in the producing step.

3. The method according to claim 2, which comprises determining the actual value of the instantaneous reactive power with the equation:

$$q = \tfrac{3}{2}(v_\beta \cdot i_\alpha - v_\alpha \cdot i_\beta),$$

where $v_\alpha$, $v_\beta$ are coordinates of a mains voltage space vector, $i_\alpha$, $i_\beta$ are coordinates of a grid system current space vector, and q is the actual value of the instantaneous reactive power.

4. The method according to claim 1, which comprises using an instantaneous reactive current component as the actual value in the producing step.

5. The method according to claim 4, which comprises determining the actual value of the instantaneous reactive current with the equation:

$$i_{sv} = (v_\beta \cdot i_\alpha - v_\alpha \cdot i_\beta)/|\underline{v}|$$

where $v_\alpha$, $v_\beta$ are coordinates of a mains voltage space vector, $i_\alpha$, $i_\beta$ are coordinates of a grid system current space vector, $|\underline{v}|$ is a magnitude of the mains voltage space vector, and $i_{sv}$ is the actual value of the instantaneous reactive current.

6. An apparatus for static and dynamic support of a mains voltage at a network node, in combination with a static power factor correction device having a transformer and a self-commutated converter with at least one capacitive energy store, the apparatus comprising:

a voltage control loop with an instantaneous control loop;

a drive element for driving the self-commutated converter of the static power factor correction device;

a subtractor having a first input receiving an angle value of a determined mains voltage space vector at the network node, a second input, and an output connected to said drive element;

said instantaneous control loop having an output connected to said second input of said subtractor.

7. The apparatus according to claim 6, wherein said voltage control loop includes a mains voltage magnitude generator and a comparator with a downstream regulator, said comparator having a non-inverting input receiving a predetermined magnitude reference value of the mains voltage space vector at the network node.

8. The apparatus according to claim 6, wherein said instantaneous control loop includes a comparator with an inverting input, a non-inverting input, a downstream regulator and a device for calculating an instantaneous actual value, said device having an output connected to said inverting input of said comparator, and said non-inverting input of said comparator being connected to an output of said regulator of said voltage control loop.

9. The apparatus according to claim 8, wherein said device for calculating the instantaneous actual value is a computer.

10. The apparatus according to claim 9, wherein said computer has a memory storing the equation:

$$q = \tfrac{3}{2}(v_\beta \cdot i_\alpha - v_\alpha \cdot i_\beta),$$

where $v_\alpha$, $v_\beta$ are coordinates of a mains voltage space vector, $i_\alpha$, $i_\beta$ are coordinates of a grid system current space vector, and q is an actual value of an instantaneous reactive power, and said computer is programmed to process the equation.

11. The apparatus according to claim 9, wherein said computer has a memory storing the equation:

where $v_\alpha$, $v_\beta$ are coordinates of a mains voltage space vector, $i_\alpha$, $i_\beta$ are coordinates of a grid system current space vector, $|\underline{v}|$ is a magnitude of the mains voltage space vector, and $i_{sv}$ is an actual value of an instantaneous reactive current, and wherein said computer is programmed to process the equation.

* * * * *